United States Patent [19]

Braun

[11] Patent Number: 4,934,362
[45] Date of Patent: Jun. 19, 1990

[54] UNIDIRECTIONAL FLUID VALVE

[75] Inventor: David L. Braun, St. Paul, Minn.

[73] Assignee: Minnesota Mining and Manufacturing Company, St. Paul, Minn.

[21] Appl. No.: 30,339

[22] Filed: Mar. 26, 1987

[51] Int. Cl.⁵ ............................................. A62B 18/10
[52] U.S. Cl. ............................ 128/207.12; 128/206.15; 137/855
[58] Field of Search .................... 128/200.29, 201.28, 128/203.11, 205.24, 206.15, 207.12, 207.16; 137/854, 855

[56] References Cited

U.S. PATENT DOCUMENTS

| 771,327 | 4/1904 | Schmidt | 137/512.15 |
|---|---|---|---|
| 2,999,498 | 9/1961 | Matheson | 137/855 |
| 3,312,237 | 4/1967 | Mon et al. | 137/855 |
| 3,416,562 | 12/1968 | Freeman | 137/855 |
| 4,414,973 | 11/1983 | Matheson et al. | 128/206.15 |
| 4,631,376 | 12/1986 | Leone | 137/855 |
| 4,749,003 | 6/1988 | Leason | 137/854 |

FOREIGN PATENT DOCUMENTS

| 1092221 | 11/1960 | Fed. Rep. of Germany | 137/854 |
|---|---|---|---|
| 488041 | 1/1976 | U.S.S.R. | 137/854 |

OTHER PUBLICATIONS

Northvale (Engineering) Ltd., Research Disclosure, Check Valve Sep. 1974.

Primary Examiner—Max Hindenburg
Assistant Examiner—John P. Lacyk
Attorney, Agent, or Firm—Donald M. Sell; Walter N. Kirn; David W. Anderson

[57] ABSTRACT

The exhalation valve of a respiratory face mask, while taking up only a small area, can afford extraordinarily low pressure drop for easy breathing if constructed with a valve seat having a seal edge that defines an orifice and also forms a parabola in the plane bisecting the mask. Preferably the seal edge forms a rectangle as viewed against the direction of composite fluid flow through the valve, and a flexible flap is attached to a bridge across the center of the orifice at the apex of said parabola, each end of the flap being free to be lifted to allow fluid to flow through the valve.

12 Claims, 2 Drawing Sheets

४,९३४,३६२

UNIDIRECTIONAL FLUID VALVE

BACKGROUND OF THE INVENTION

1. Field of the Invention

The invention relates to unidirectional fluid valves, especially the exhalation valve of a respirator face mask and, to a lesser extent, the inhalation valve.

2. Description of the Related Art

A typical respirator face mask such as that shown in U.S. Pat. No. 4,414,973 (Matheson et al.) has an air-purifying filter extending from each cheek area, between which is mounted an exhalation valve directly in front of the wearer's mouth and nose. Increasing the sizes of the air-purifying filters increases the filtering efficiency, or functional life, and lowers the breathing resistance, but may require a reduction in the size of the exhalation valve if the exhalation valve is kept in the same position and out of the wearer's field of vision. Any reduction in the size of the exhalation valve increases the pressure drop through the exhalation valve, making it more difficult for the wearer to breathe.

The exhalation valve of FIG. 9 of the Matheson patent has an annular seat at the periphery of an annular orifice that can be closed by a flap 450 which "is molded with a conical configuration, with the interior concavity seating against the edge 416 of the seat 410" (col. 9, lines 13-15). The flap flexes in the direction of the arrows B to the dotted position when the user exhales.

Siebe North Inc. respirator face piece No. 7700 has an exhalation valve similar to that of the Matheson patent except that its flap is nearly flat (slightly concave toward the seat) and has been formed with diametrically aligned ribs so that upon being lifted off the seat, it assumes substantially the shape of a portion of a cylindrical surface. By doing so, the flap should exert less resistance to being lifted from the seal ridge valve seat than when its entire circular periphery is lifted to the same extent.

Inhalation valves of respiratory face masks are usually constructed in the same manner as are the exhalation valves. The inhalation valve of FIG. 10 of the Matheson patent shows a disk-like flap 338 being moved in the direction of arrows A to the dotted shape during inhalation. In FIG. 13, the same flap 338 is said to be "oriented in a concave manner (viewed from the outlet) so as to move more readily from its seating surface. This avoids the popping associated with prior art valves" (col. 8, lines 26-29). Inhalation valves, however, are not required to seal as effectively on closure as are exhalation valves, and in some respiratory face masks do not maintain full contact between the flap and seat in the rest position.

In the respirator face mask of FIG. 4 of U.S. Pat. No. 4,630,604 (Montesi), the flap of the exhalation valve 26 appears to have the same shape at rest as does that of the inhalation valve of FIG. 13 of the Matheson patent.

3. Other Related Art

Of possible pertinence to the present invention are prior disclosures of valves which would not be useful as exhalation valves for respirator face masks, but have uses to which unidirectional valves of the present invention could be put. One of these, U.S. Pat. No. 771,327 (Schmidt), concerns a valve which is especially adapted for use in pumps working with a high vacuum and mentions steam-turbines, gas-compressors, and vacuum pumps. It shows in FIGS. 1 and 2 a valve having a seat 8 in the form of a portion of a cylindrical surface and formed with passages 9 that can be closed by a spring 12 of the same form. The spring, which may be rectangular or may have the shape shown in FIG. 2, is attached to the center of the seat, and its free ends lift to the position shown in FIG. 1 to allow fluid to pass upwardly through the passages 9.

SUMMARY OF THE INVENTION

The invention provides a unidirectional fluid valve for a respiratory face mask, across which valve there is a significantly lower pressure drop compared to prior valves of the same size. Briefly, the novel valve comprises:

a valve seat having a seal edge defining an orifice which has a substantially unrestricted inlet, a bridge extending across the orifice, and a flexible flap attached to the bridge with at least one end of the flap free to be lifted from the seal edge of the valve seat, and when the flap rests on the seal edge, (1) the flap completely covers the orifice, (2) the entire inner face of the flap is substantially flat in the direction of the bridge, and (3) a first line orthogonal to the inner surface of the flap at the center of an outer extremity of the seal edge and a second line orthogonal to the inner surface of the flap at the center of the bridge intersect at an angle of greater than 15°.

Because that angle is greater than 15°, the orifice area available for fluid flow is effectively enlarged when the valve is mounted so that said second line approximates the direction of composite fluid flow through the valve. At larger angles the available orifice area becomes even larger, thus permitting a further reduction in the pressure drop without increasing the area occupied by the valve in the plane orthogonal to the direction of composite fluid flow. That angle preferably is from 50° to 70°. A substantially higher angle would introduce a risk that the flap might not remain firmly seated on the valve seat against gravity and inertial acceleration.

Preferably, the bridge to which the flap is attached extends across the center of the orifice, the seal edge of the valve seat forms an inflection-free curve as viewed in the crossing direction of the bridge, the minimum radius of curvature of the curve is at the bridge, and both ends of the flap are free to be lifted from the seal edge. Preferably, the radius of curvature of said curve gradually increases from the attaching bridge toward each of the outer extremities of the seal edge, thus minimizing the danger of the flap bridging an intermediate portion of the valve seat. A preferred curve approximates a parabola.

When the seal edge of the valve seat forms an inflection-free curve as viewed in the direction of the attaching bridge, the flap may be formed from a flat material, e.g., by being cut from a flat sheet of uniform thickness. The material preferably is selected so that a bias is created toward the valve seat when the flap is attached to the bridge. The bias may be increased by increasing the thickness of the flap, but such increase raises the pressure drop across the valve. When the thickness of the flap has been doubled in testing, the pressure drop has increased more than 50 percent. The sheet preferably is elastomeric and is selected to be resistant to compression set in long-term storage or use, including incidental exposure to high temperatures.

When the seal edge of the valve seat appears as a substantially straight line as viewed in the direction of the bridge, the flap preferably is formed so that its inner face is normally concave before being attached to the bridge.

Preferably, the seal edge of the valve seat comprises a rounded seal ridge, and the radius of curvature of the seal ridge in cross section is from one-half to twice the thickness of the flap. A smaller radius of curvature would provide a better seal, but this would tend to make the seal ridge more expensive to manufacture. While a larger radius of curvature would be more economical, the seal may not be as reliable.

When the seal edge of the valve seat lies in a parabola as viewed in the direction of the attaching bridge, that bridge preferably is at or near the apex of the parabola, and the aforementioned angles with respect to each end of the flap are substantially equal. When so constructed for a respiratory face mask, it usually is desirable for the orifice of the valve seat to be narrower in the direction of the flap-attaching bridge than it is in the orthogonal direction. By then orienting the valve so that its longer dimension lies in the plane bisecting the mask, inhalation filters at the cheek areas can be closely spaced. When so oriented, gravity assists in keeping the lower end of the flap seated when the wearer is upright, but gravity works against seating of the upper end. Accordingly, for uses in which respiratory face masks are always kept substantially upright, it may be desirable to make the valve asymmetric by forming the valve seat and the flap so that the portions of the orifice and flap above the attaching bridge are smaller than those below the bridge. By the same token, it may be desirable to position the flap-attaching bridge somewhat closer to the upper extremity of the seal edge than to the lower extremity, in which event it may also be desirable to reduce the radii of curvature of the upper portion of the aforementioned inflection-free curve.

To attain the lowest pressure drop across a novel valve which has been constrained in width by the space between cheek filters, the orifice and flap usually are as long as possible within the available frontal area, thus minimizing the pressure drop. However, if the flap is too long, it might not have sufficient resilience to become quickly seated and to resist extraneous unseating forces.

The bridge to which the flap is attached can form one extremity of the orifice, with only one end of the flap being free, but when the valve is to serve as an exhalation or inhalation valve of a respiratory face mask, the orifice and flap preferably extend away from both sides of the bridge.

When the novel unidirectional fluid valve serves as the exhalation valve of a respiratory face mask, the free end or ends of the flap present little resistance to being lifted from the valve seat when the wearer exhales. In a prototype which has a parabolic valve seat with the flap attached at the apex, that resistance is far less than the resistance of any prior valve of comparable frontal area of which I am aware. Upon being lifted when the wearer exhales, the flap of the prototype inherently assumes a curved shape that apparently helps to make air flow through the valve more smoothly. For the same reason, the prototype valve preferably is fitted with an inlet bell.

THE DRAWING

In the drawing, all figures of which are schematic,

Figure 1:
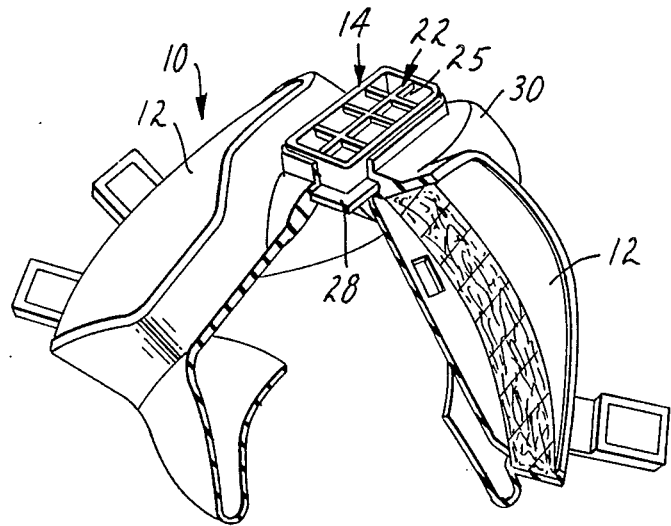
FIG. 1 is a perspective view of a respiratory face mask in which the aforementioned prototype valve of the invention serves as the exhalation valve.

As seen in FIG. 1, a respiratory face mask 10 includes a pair of air-purifying filters 12 in the cheek areas, between which an exhalation valve 14 of the invention is mounted directly in front of the nose and mouth of a wearer. The seat 16 of the valve is a molded plastic lattice having a rounded seal ridge 18 which has a parabolic profile as viewed in FIG. 2 and forms a rectangle as viewed against the direction of composite fluid flow which is indicated by arrows 34. Extending between the long sides of the rectangle are a central bridge 19 and four other bridges 20 which divide the orifice within the seal ridge 18 into six ports 21. Attached to the central bridge 19 by a cover 22 is a rectangular, flexible, elastomeric flap 24 which normally rests on the seal ridge 18, thus closing the orifice. The cover 22 includes a grill 25 to shield the valve against debris.

Figures 2, 3:
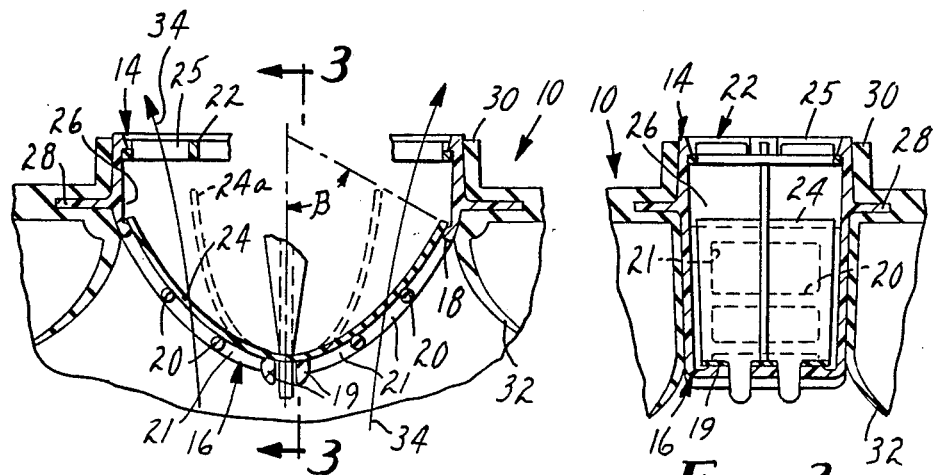
FIG. 2 is a fragmentary cross section through the valve of FIG. 1 as viewed in the crossing direction of the central bridge and along a plane bisecting the face mask.
FIG. 3 is a cross section along line 3—3 of FIG. 2.

In the valve 14 as shown in FIG. 2, the angle $\beta$ is 62° between a first line orthogonal to the inner face of the flap 24 at each outer extremity 26 of the seal edge and a second line orthogonal to the inner face of the flap at the central bridge 19.

In addition to the flap-attaching function of the central bridge 19, it and the other bridges 20 stabilize the seal ridge 18. The bridges 20 also prevent the flap 24 from inverting into the orifice under reverse air flow. The surface of each of the bridges 19 and 20 is either aligned with or slightly recessed beneath the seal ridge 18, thus ensuring that none of the bridges lifts the flap 24 off the seal ridge. By slightly recessing the bridges, the sealing force can be increased, but more than slight recessing could cause the flap to buckle.

A rectangular flange 28 around the valve 14 is sealed into the front of a respirator face piece 30. Integrally formed with the face piece is an inlet bell 32, the inward face of which is parabolic and coincides with the seal ridge 18. When a wearer of the face mask 10 exhales, the composite air flow in the direction of arrows 34 lifts the free ends of the flap 24 off the seal ridge 18, causing the flap to assume the curved shape indicated in FIG. 2 by dotted lines 24a. The curved shapes of the facing surfaces of both the inlet bell 32 and the lifted flap appear to facilitate a smooth flow of exhaled air, thus contributing to the extraordinarily low drop in pressure across the prototype exhalation valve 14.

An inlet bell, instead of being part of a respirator face piece, can be integrally molded with the valve as a single piece of plastic. However, this would complicate the mold.

Figure 4:
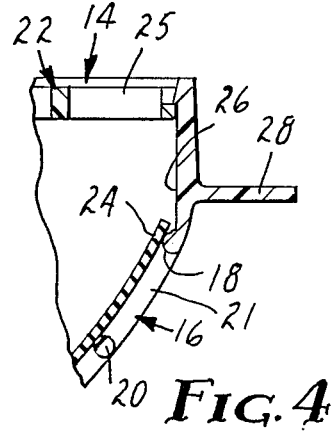
FIG. 4 is an enlarged cross section of the right hand portion of the valve of FIG. 2; and Each of FIGS. 5 and 6 is a perspective view of an exhalation valve as illustrated in FIGS. 1–3 except being fitted with a different cover.

To ensure that the flap 24 closes hermetically against the seal ridge when the wearer inhales, the radius of curvature of the seal ridge 18, as best seen in FIG. 4, is quite small, approximating the thickness of the flap 24. For economy, the valve seat preferably is an injection molded plastic, and the mold is highly polished so that the seal ridge has a very smooth and uniform surface.

While the rectangular shape of the seal ridge 18 as viewed against the direction of composite fluid flow is preferred for simplicity and economy of construction, it could have other shapes such as an ellipse, a cross or a truncated diamond.

Figure 5:
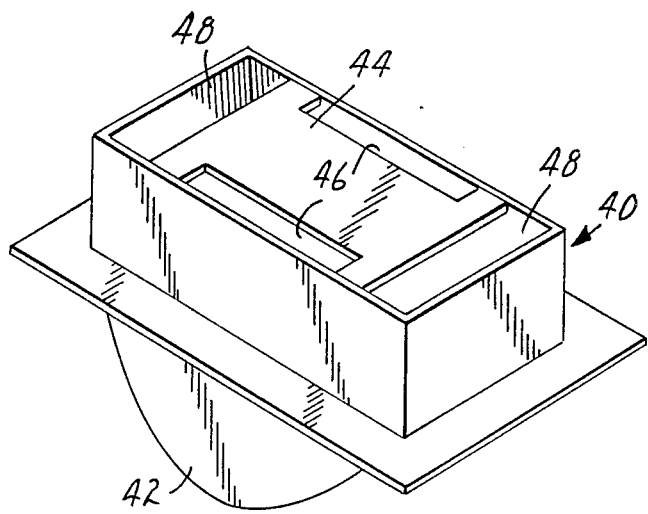

The cover 40 shown in FIG. 5 for an exhalation valve 42 has a top wall 44 which shields against wind and debris. Exhaled air passes through side openings 46 and end openings 48.

Figure 6:
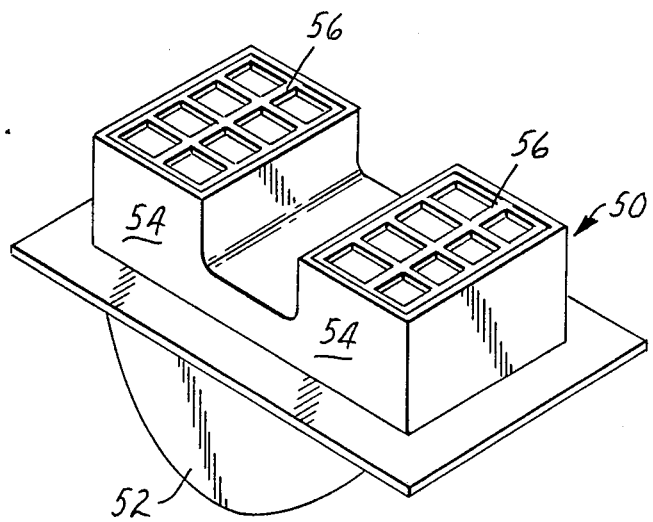

The cover 50 shown in FIG. 6 for an exhalation valve 52 includes a pair of ducts 54, each having a protective grill 56.

EXAMPLE 1

A valve similar to that shown in FIGS. 1–4 was made except omitting the cover 22 and inlet bell 28 and having a flat seal edge instead of a seal ridge 18. The valve seat was vacuum formed from polystyrene sheet having a thickness of 0.76 mm, and six openings were cut to form an orifice 0.94 cm in width and crossed by five bridges which were rectangular in cross section. The central bridge was 0.75 cm in breadth and the other bridges 0.20 cm in breadth. The depth of the valve seat was 1.9 cm, and the span between the outer extremities of the seal edge was 3.26 cm. The flap was cut (1.27×5.33 cm) from a flat sheet of pure gum rubber (No. 2932-71; Nott Rubber Company, Minneapolis, MN) 0.38 mm in thickness. A line orthogonal to the inner face of the flap at the center of the outer extremity of the seal edge formed an angle of 65° with the direction of composite fluid flow through the valve.

EXAMPLE 2

A valve was made as in Example 1 except that the depth of the valve seat was 1.35 cm, said angle was 60°, and the flap was 1.27×4.13 cm. Accordingly, the ports of its orifice were smaller than those of Example 1. However, to make those ports larger would have required the valve to take up more frontal area of a respiratory face mask when used as an exhalation valve.

COMPARATIVE EXAMPLE 3

A valve was made as in Example 1 except that the seal edge lay in a plane. Hence, the span of the orifice was 3.26 cm, and the flap was 1.27×3.61 cm. Each of the valves of Examples 1 and 2 and of Comparative Example 3 occupied the same frontal area. Three valves of each of Examples 1 and 2 and Comparative Example 3 were tested with vertically upward air flow of 85 liters per minute at ordinary room temperature, and the drop in pressure across each valve was measured. Average results of 3 valves of each example are reported in Table I.

TABLE I

|  | Pressure Drop (mm H$_2$O) |
| --- | --- |
| Example 1 | 3.8 |
| Example 2 | 6.2 |
| Comparative Example 3 | 7.9 |

EXAMPLES 4, 5, AND COMPARATIVE EXAMPLE 6

Valves of Examples 4, 5 and Comparative Example 6 were made as in Examples 1, 2, and Comparative Example 3, respectively, except that the orifice widths were 2.18 cm and the flap widths were 2.54 cm. Results of testing three of each example are reported in Table II

TABLE II

|  | Pressure Drop (mm H$_2$O) |
| --- | --- |
| Example 4 | 1.8 |
| Example 5 | 2.1 |
| Comparative Example 6 | 3.1 |

EXAMPLE 7

A valve as in Example 2 was modified by (1) reducing the breadth of the bridges 20 to 0.15 cm, (2) increasing the orifice width to 1.0 cm, (3) adding an inlet bell 28 as illustrated in FIG. 2 and a cover as illustrated in FIGS. 4 of the drawing, and (4) forming a clay air foil smoothly connecting the edges of the central bridge 19 with the inside edges of the openings 46 and 48 of the cover 40. Results of single pressure-drop tests are reported in Table III.

TABLE III

|  | Pressure Drop (mm H$_2$O) |
| --- | --- |
| Example 7 |  |
| (with cover, air foil and inlet bell) | 4.7 |
| (with cover and air foil, no inlet bell) | 5.3 |
| (with inlet bell, no cover) | 4.0 |
| (cover, no air foil or inlet bell) | 6.3 |

A change that can be made in the novel to make the flap thinner toward its free ends, and this would afford less resistance to opening. However, a flap of uniform thickness as in the above example should be more economical, and fully satisfactory for most purposes.

The flap may be two pieces with an edge of each piece attached to a bridge, in which event the attaching surface of the bridge may be V-shaped. In this event, the line orthogonal to the inner face of the flap at the center of the bridge may lie in the plane bisecting the V-shaped bridge surface.

Although the novel valve is primarily intended for use as the exhalation valve of a respiratory face mask, it can be used as an inhalation valve. Because inhalation valves do not involve space constraints comparable to the importance of keeping an exhalation valve small, the novel valve involves less advantage over the prior art in such use. The novel valve also should be useful for fluids other than air, including liquids, whenever there is a need for a minimal pressure drop across a valve which must be relatively small in size.

I claim:

1. Unidirectional fluid valve comprising:

an inlet and an outlet for the flow of fluid from said inlet to said outlet;

a valve seat having a first seal edge in the form of an inflection-free concave curve, with respect to said outlet, said first seal edge including two ends, an apex intermediate said ends and a radius of curvature continually increasing from said apex to each of said ends; a second seal edge identical to said first seal edge and parallel to and spaced from said first seal edge; and two valve seat ends each connecting corresponding ends of said first and said second seal edges;

a bridge extending between said first and said second seal edges intermediate said first and said second seal edge ends, said bridge extending perpendicular to the direction of flow of said fluid from said inlet to said outlet;

a flexible flap formed of a sheet material in a generally rectangular shape and attached to said bridge and covering said valve seat in the absence of fluid flow through said valve, said flap being free to be lifted from said valve seat in response to and to accommodate fluid flow through said valve.

2. Unidirectional valve as defined in claim 1 wherein said valve seat ends are each straight and perpendicular to said direction of fluid flow from said inlet to said outlet.

3. Unidirectional valve as defined in claim 1 wherein an angle between a radius of curvature of said seal edge at one of said seal edge ends and a radius of curvature of said seal edge at said apex is greater than 15°.

4. Unidirectional fluid valve as defined in claim 3 wherein said angle is from 50° to 70°.

5. Unidirectional fluid valve as defined in claim 1 wherein said bridge is centered between said first and said second valve seal edge ends, and both ends of said flap are free to be lifted from said valve seat.

6. Unidirectional fluid valve as defined in claim 1 wherein said first and second valve seal edges are parabolas, and said bridge is at or near said apexes of said first and said second valve seal edges.

7. A respirator face mask having air-purifying means in each cheek area, between which cheek areas is mounted an exhalation valve comprising:

an inlet and an outlet for the flow of fluid from said inlet to said outlet;

a valve seat having a first seal edge in the form of an inflection-free concave curve, with respect to said outlet, said first seal edge including two ends, an apex intermediate said ends and a radius of curvature continually increasing from said apex to each of said ends; a second seal edge identical to said first seal edge and parallel to and spaced from said first seal edge; and two valve seat ends each connecting corresponding ends of said first and said second seal edges;

a bridge extending between said first and said second seal edges intermediate said first and second seal edge ends, said bridge extending perpendicular to the direction of flow of said fluid from said inlet to said outlet;

a flexible flap formed of a sheet material in a generally rectangular shape and attached to said bridge and covering said valve seat in the absence of fluid flow through said valve, said flap being free to be lifted from said valve seat in response to and to accommodate fluid flow through said valve.

8. A respirator face mask as defined in claim 7 wherein said valve seat ends are each straight and perpendicular to said direction of fluid from said inlet to said outlet.

9. A respirator face mask as defined in claim 7 wherein an angle between a radius of the curvature of said seal edge at one of said seal edge ends and a radius of curvature of said seal edge at said apex is greater than 15°.

10. A respirator face mask as defined in claim 9 wherein said angle is from 50° to 70°.

11. A respirator face mask as defined in claim 7 wherein said bridge is centered between said first and said second valve seal edge ends, and both ends of said flap are free to be lifted from said valve seat.

12. A respirator face mask a defined in claim 7 wherein said first and said second seal edges are parabolas, and said bridge is at or near said apexes of said first and said second valve seal edges.

* * * * *